(12) United States Patent
Soliman

(10) Patent No.: US 9,226,339 B2
(45) Date of Patent: Dec. 29, 2015

(54) METHOD AND APPARATUS FOR COOPERATIVE MULTIFUNCTIONAL COMMUNICATION IN A WIRELESS COMMUNICATION SYSTEM

(75) Inventor: Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 12/630,587

(22) Filed: Dec. 3, 2009

(65) Prior Publication Data
US 2011/0134832 A1 Jun. 9, 2011

(51) Int. Cl.
*H04W 88/06* (2009.01)
*H04W 52/02* (2009.01)

(52) U.S. Cl.
CPC .......... *H04W 88/06* (2013.01); *H04W 52/0258* (2013.01)

(58) Field of Classification Search
CPC ..................................................... H04W 80/04
See application file for complete search history.

(56) References Cited

U.S. PATENT DOCUMENTS

| 5,726,984 | A * | 3/1998 | Kubler et al. ................. 370/349 |
| 7,558,604 | B2 * | 7/2009 | Narayanaswami et al. ... 455/574 |
| 8,355,364 | B1 * | 1/2013 | Vargantwar et al. .......... 370/328 |
| 2004/0063451 | A1 * | 4/2004 | Bonta et al. .................... 455/519 |
| 2004/0090952 | A1 | 5/2004 | Kubler et al. |
| 2004/0210657 | A1 * | 10/2004 | Narayanan et al. ........... 709/227 |
| 2006/0087993 | A1 | 4/2006 | Sengupta et al. |
| 2007/0126562 | A1 | 6/2007 | Ku |
| 2008/0192666 | A1 * | 8/2008 | Koskan et al. ................ 370/311 |
| 2009/0221303 | A1 | 9/2009 | Soliman |
| 2009/0319613 | A1 * | 12/2009 | Hjelm et al. .................. 709/204 |
| 2009/0319824 | A1 * | 12/2009 | Liu et al. .......................... 714/4 |

FOREIGN PATENT DOCUMENTS

| EP | 1480394 A1 | 11/2004 |
| JP | 2004104531 A | 4/2004 |
| JP | 2004343219 A | 12/2004 |
| JP | 2008521309 A | 6/2008 |
| JP | 2008278170 A | 11/2008 |
| JP | 2009538087 A | 10/2009 |
| WO | WO-2006053951 | 5/2006 |
| WO | WO-2007139578 A1 | 12/2007 |

OTHER PUBLICATIONS

International Search Report and Written Opinion—PCT/US2010/058753, ISA/EPO—May 11, 2011.
Taiwan Search Report—TW099142157—TIPO—Jun. 18, 2013.

\* cited by examiner

*Primary Examiner* — Samina Choudhry
(74) *Attorney, Agent, or Firm* — Steven R. Thiel

(57) ABSTRACT

The described apparatus and methods may include a controller configured to determine capabilities of at least one remote access terminal, and delegate at least one task to the at least one remote access terminal based on the capabilities.

37 Claims, 4 Drawing Sheets

METHOD AND APPARATUS FOR COOPERATIVE MULTIFUNCTIONAL COMMUNICATION IN A WIRELESS COMMUNICATION SYSTEM

BACKGROUND

1. Field

The present disclosure relates generally to wireless communication systems. More specifically, the present disclosure relates to a method and apparatus for cooperative multifunctional communication in a wireless communication system.

2. Introduction

Wireless communication systems are widely deployed to provide various communication services such as voice, video, packet data, messaging, broadcast, etc. These systems may be multiple-access systems capable of supporting communication with multiple users by sharing the available system resources (e.g., bandwidth, time slots, codes, and transmit power). Examples of such multiple-access systems include Code Division Multiple Access (CDMA) systems, Time Division Multiple Access (TDMA) systems, Frequency Division Multiple Access (FDMA) systems, 3GPP Long Term Evolution (LTE) systems, orthogonal Frequency Division Multiple Access (OFDMA) systems, Single-Carrier FDMA (SC-FDMA) systems, and Global Navigation Satellite Systems (GNSS), such as the United States NAVSTAR Global Positioning System (GPS), the Russian GLONASS, and the European Union's Galileo positioning system.

Mobile devices may have multiple radios such as wide area network radio (WAN), local area radio (LAN) and personal area radio (PAN). The mobile device may be capable of communication and performance of system-specific operations within more than one of the communication systems. For example, two mobile devices may be capable of initiating a data transfer operation with one another within a Personal Area Network (PAN) via Bluetooth, and may also be capable of determining their respective geographic coordinates via GNSS. If incapable of cooperation, the two mobile devices would each have to receive and process GNSS signals in order to determine their geographic coordinates. Such redundant processing results in unnecessary power consumption. Accordingly, there exists a need in the art for a method and apparatus for cooperative multifunctional communication so as to reduce redundant processing and extend battery life.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect of the disclosure, a wireless communication apparatus may include a controller configured to, determine capabilities of at least one remote access terminal, and delegate at least one task to the at least one remote access terminal based on the capabilities.

According to another aspect of the disclosure, a method for wireless communication, including determining capabilities of at least one remote access terminal, and delegating at least one task to the at least one remote access terminal based on the capabilities.

According to a further aspect of the disclosure, an apparatus may include means for determining capabilities of at least one remote access terminal, and means for delegating at least one task to the at least one remote access terminal based on the capabilities.

According to yet a further aspect of the disclosure, a computer program product, may include a computer-readable medium including code for determining capabilities of at least one remote access terminal, and code for delegating at least one task to the at least one remote access terminal based on the capabilities.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
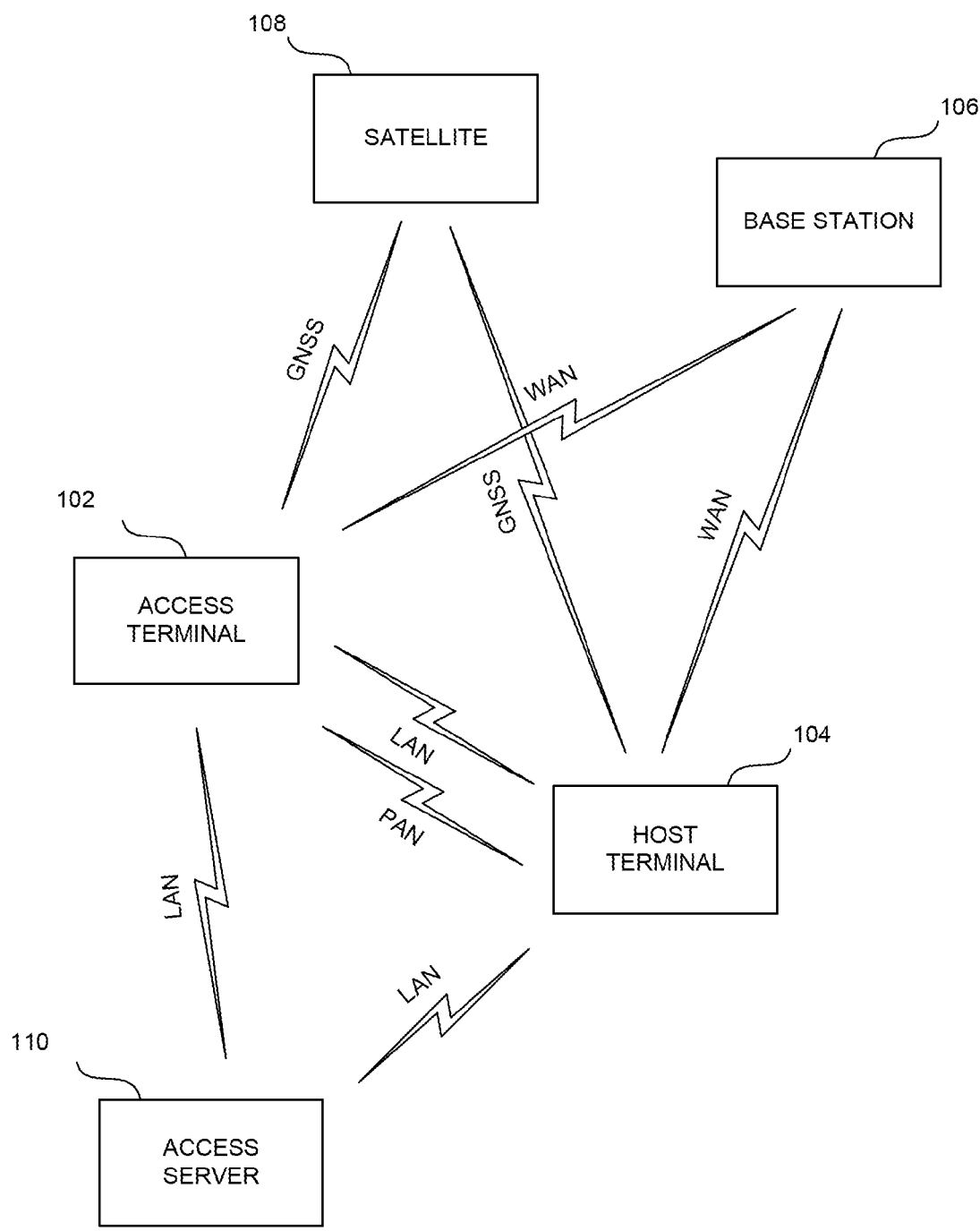
FIG. 1 illustrates aspects of a wireless communication system capable of cooperative multifunctional communication.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system," "apparatus" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, host terminal, user terminal, communication device, user agent, user device, or user equipment (UE). A wireless terminal, which may also be referred to as an access terminal, a remote access terminal, a host terminal, a wireless communication apparatus, or an apparatus, may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology. An access server may be utilized for communicating with wireless terminal(s) via an integrated wireless transceiver or a peripheral wireless transceiver and for providing access to the Internet or other networks.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, Bluetooth, Ultra Wideband (UWB), ZigBee, and any other short-range or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

FIG. 1 shows a wireless communication system 100. System 100 may include an access terminal 102, a host terminal 104, a base station 106, a satellite 108, and an access server 110. According to various implementations, the host terminal 104 may be another access terminal, such as a mobile phone, cellular phone, laptop computer, personal digital assistant device, and/or any other device with communication capabilities. In some applications, the functionality and/or operation of the host terminal 104 may be integrated into an access point (e.g., base station, node B, femto cell, pico cell, etc.) that includes transceivers for communication over a plurality of protocols (e.g., LTE, WiFi, Bluetooth, UWB) that are configured to operate as described herein.

Although FIG. 1 shows only one access terminal 102, one host terminal 104, one base station 106, one satellite 108, and one access server 110, the communication system 100 may include any number of access terminals, host terminals, base stations, satellites, and access servers.

The access terminal 102 and the host terminal 104 may each include multiple communication transceivers (not shown) for receiving and transmitting signals over different ranges at different powers. For example, the access terminal 102 and the host terminal 104 may each include multiple transceivers for communication within Wide Area Networks (WAN), wireless Local Area Networks (LAN), and Personal Area Networks (PAN). The access terminal 102 and the host terminal 104 may also include a GNSS receiver. The GNSS receiver may be any receiver compliant with orbital communication standards, and may be configured to receive signals from very large distances, such as from orbital satellites. The WAN transceiver may be any transceiver compliant with regional, national, and/or global communication standards (e.g., CDMA, LTE, etc.), and may be configured to transmit and receive signals over distances spanning regional, national, and/or global areas, such as to and from base stations. The LAN transceiver may be any transceiver compliant with any standard that facilitates medium range communication (e.g., 802.11g, 802.11n, etc.), and may be configured to transmit and receive signals over intermediate distances, such as to and from devices within an office building, such as access servers, for example. The PAN transceiver may be any transceiver compliant with any standard that facilitates short-range, low-power communication (e.g., UWB, Bluetooth, ZigBee, etc.), and may be configured to transmit and receive signals over short distances, such as to and from devices located in close proximity to one another. One difference between the transceivers is that the PAN transceiver may consume less power than the longer range transceivers. Consequently, the GNSS, WAN, and LAN transceivers may also be referred to as high power transceivers and the PAN transceiver may be referred to as a low power transceiver. It should be clear that the terms "high power" and "low power" are relative terms and do not imply a particular level of power consumption. That is, the low power transceiver simply consumes less power than the high power transceiver.

All of the elements in the communication system 100 may constitute different networks facilitating communication among the various elements. For example, the base station 106, the access terminal 102, and the host terminal 104 may constitute a part of a WAN, where the terminals 102 and 104 communicates with the base station 106 using the WAN transceiver; the access terminal 102 and the host terminal 104 may also be configured to receive positioning signals from satellite 108 as part of a GNSS network via respective GNSS receivers; access terminal 102, access terminal 104, and access server 110 may communicate with one another within a LAN via their respective LAN transceivers; and terminals 102 and 104 may communicate with one another within a PAN via their respective PAN transceivers.

The access terminal 102 may be configured for improved power conservation by using one or more access terminals, such as the host terminal 104, as a proxy host terminal to perform various functions on behalf of the access terminal 102, while the access terminal 102 shuts "off" its GNSS, WAN, and/or LAN transceivers depending on the scenario.

The access terminal 102 may locate (e.g., discover) local host terminals 104 by scanning via its various transceivers. In some implementations, the PAN transceiver of access terminal 102 may be used to scan for host terminals since it is the transceiver that will be used to receive signals when the high power transceivers are turned "off." In performing such a scan, the access terminal 102 may attempt to identify potential host terminals that have similar transceivers. This is so that a host terminal is able to receive signals via its high power transceivers and forward them to the intended access terminal via the low power transceiver.

During discovery of the host terminals, the access terminal 102 may perform a capability inquiry that will trigger the host terminals to provide the access terminal 102 with information regarding their respective capabilities (e.g., GNSS navigation, network search and acquisition, base station signal monitoring, pattern identification and/or classification, sensing, etc.).

Once the access terminal 102 has determined the available host terminals and their respective capabilities, it may negotiate with one or more of the available host terminals to serve as its proxy. For example, the access terminal 102 may select one host terminal to serve as its "proxy" based on which available host terminal is less sensitive to power consumption than the access terminal 102, which host terminal is capable of performing one or more specific tasks on behalf of the access terminal 102, and/or which host terminal has the best or strongest short range link as measured or perceived at the access terminal's short range transceiver.

Once a proxy host terminal has been identified and selected, a communication link via the low power transceivers of both the access terminal 102 and host terminal 104 may be established or setup. For example, if the low power transceivers are Bluetooth compliant, the host terminal 104 may be configured to operate according to a pseudo-random sequence called a hop sequence or frequency hop sequence so that the host terminal 104 and the access terminal 102 can communicate with each other via their respective low power transceivers. During or before the communication link setup, the access terminal 102 may establish a secure relationship with the host terminal 104. By establishing a secure relationship, the access terminal 102 may trust the selected host terminal 104 acting as its proxy to perform various functions on behalf of the access terminal 102.

The access terminal 102 may then delegate to one or more of the host terminals 104 a number of tasks to be performed on behalf of the access terminal 102. It may provide its parameters to the selected host terminal 104 to facilitate performance of the delegated task. In implementations where the selected host terminal 104 and access terminal 102 are both listening to the same base station 106, their clocks may already be synchronized by virtue of listening to the same base station 106. In an alternative implementation, the access terminal 102 may instead provide clock information for various channels (e.g., paging channels) so that the host terminal can synchronize its own clock to it.

Once the tasks are delegated, the access terminal 102 may then power down (or turn "off") all or part of its high power transceivers and may activate its low power transceiver to receive transmissions from the host terminal 104. As the high power transceivers consume more power than the low power transceiver, shutting the high power transceivers off and using the low power transceiver to receive transmissions from the host terminal 104 facilitates power conservation at the access terminal 102.

The host terminal 104 may then perform the task delegated by the access terminal 102. In one example, the host terminal 104 may use its high power transceiver to listen for, or receive, paging messages on behalf of the access terminal 102. When the host terminal 104 detects a paging message intended for the access terminal 102, the host terminal 104 may forward the paging message to the access terminal 102 via its low power transceiver. The forwarded paging message may include at least a portion of the original paging content, sufficient enough to respond to the paging message, including, but not limited to a traffic channel and a sector. Upon receipt of some or all of the content of the paging message, the access terminal 102 may turn "on" its high power transceiver and may respond directly to the base station 106 sending the paging response message via its high power transceiver (i.e., WAN transceiver).

In another example, the host terminal 104 may use its high power transceiver to listen for, or receive, "presence information" from an Instant Messaging (IM) system. The IM system is a form of real-time communication between two or more people based on typed text. The text may be conveyed via terminals connected over a network. The system may allow users to subscribe to each other and be notified of changes in each other's status (e.g., available, busy, away, offline, mobile, etc.), as set by the user, and for users to send each other short instant messages. Most services may offer a "presence information" feature, indicating the status of the user and whether people on the user contact list are currently online and available to communicate. By consulting this service, a user has a good chance of predicting if a message will get to its recipient. In the case of instant messaging presence update, the access terminal 102 may delegate to the host terminal 104 the task of updating the access terminal with any changes in the "presence information."

When the host terminal 104 detects a change in the "presence information," the host terminal 104 may forward the updated "presence information" to the access terminal 102 via its low power transceiver. The forwarded "presence information" may indicate another user's changed communication status (e.g., available, busy, away, offline, mobile, etc.) to the user of the access terminal 102. In addition to transmitting the "presence information" update regarding user status for the access terminal 102, the host terminal 104 may also transmit to the access terminal 102 the "presence information" update regarding user status for the host terminal 104. The access terminal 102 may also transmit its own "presence information" update indicating its own availability status to the host terminal 104 via the low power transmitter, such that the host terminal 104 may notify an access server 110 or a base station 106 of the availability status on behalf of the access terminal 102.

In another example, the access terminal 102 may prompt the host terminal 104 to search for available networks or discover other available services by transmitting a network search request or service discovery request to the host terminal 104 via the low power transceiver. The host terminal 104 may then conduct a search or discovery via its respective high power transceivers for any available communication networks or services and transmit a list of its findings to the access terminal 102 via the low power transceiver. Upon receipt of the available network and/or service list, the access terminal 102 may indicate to the user the available networks and/or services or connect to any of the available networks or services automatically. The host terminal 104 may also conduct a periodic search and discovery of alternate networks and services and provide the access terminal 102 with an updated list of detected networks and services. The host terminal 104 may also discover an update to an existing service and notify the access terminal 102 of the update.

In another example, a user may initialize a GPS application on the access terminal 102 in order to determine the user's geographic coordinates. The access terminal 102 may then relay the application's request for coordinates to the host terminal 104 via the low power transceiver. The host terminal 104 may then receive signals from satellites via its high power GNSS receiver, process GNSS signals received from the satellites, and transmit the geographic coordinates to the access terminal 102 via the low power transmitter for processing and display by the GPS application. The host terminal 104 may be configured to periodically update the access terminal 102 with the geographic coordinates or be configured to only transmit an update when the coordinates have changed, or when prompted by the access terminal 102.

In another example, the access terminal 102 may be configured to include an image sensor (e.g., digital camera). A user may take a digital image with the image sensor and initialize an application to process the image data (e.g., perform pattern recognition, identification, etc.). If the host terminal 104 is capable of performing the processing required by the application, the access terminal 102 may relay the digital image data to the host terminal 104 via the low power transceiver such that the host terminal 104 performs the processing on behalf of the access terminal 102. Upon completion of the processing, the host terminal 104 may transmit the processed data to the access terminal 102 via the low power transceiver.

In yet another example, the access terminal 102 may utilize the host terminal 104 as a remote sensor (e.g., acoustic, optical, chemical, etc.). The host terminal 104 may be configured to continuously sense and alert the access terminal 102 upon an event that triggers the sensor of the host terminal 104. The alert may be transmitted across the low power transceiver.

In this manner, the access terminal 102 may improve its power conservation by offloading any task requiring the use of a high power transceiver or data processing to the host terminal 104.

In yet another feature, the host terminal 104 may be a terminal that is battery operated but has a longer battery life or an external power source. For example, if the access terminal 102 is battery operated but its internal power source is below a desired threshold, it may seek a host terminal within wireless transmission range (with a longer battery life than the access terminal 102) to act as a proxy for the access terminal 102. If the host terminal 104 is acting as the proxy for the access terminal 102, the access terminal 102 may power down its high power transceivers and power up its low power transceiver to receive any paging messages via the host terminal's low power interface, or transmit task requests to be performed by the host terminal 104 on behalf of the access terminal 102.

According to yet another feature, the access terminal 102 may periodically transmit a ping over its low power transceiver to the host terminal 104 to determine if the host terminal 104 is still within range to act as a proxy. If a specified amount of time elapses without a response to the ping from the host terminal 104, the access terminal 102 may power up its high power transceiver and switch to a normal mode of operation where there is no proxy, since the host terminal 104 is no longer acting as its proxy. If another host terminal is detected within transmission range, the access terminal 102 may associate with the new host terminal, delegate the new host terminal a task, and power down its high power transceiver and activate its low power transceiver to receive notification from the new host terminal.

Figure 2:
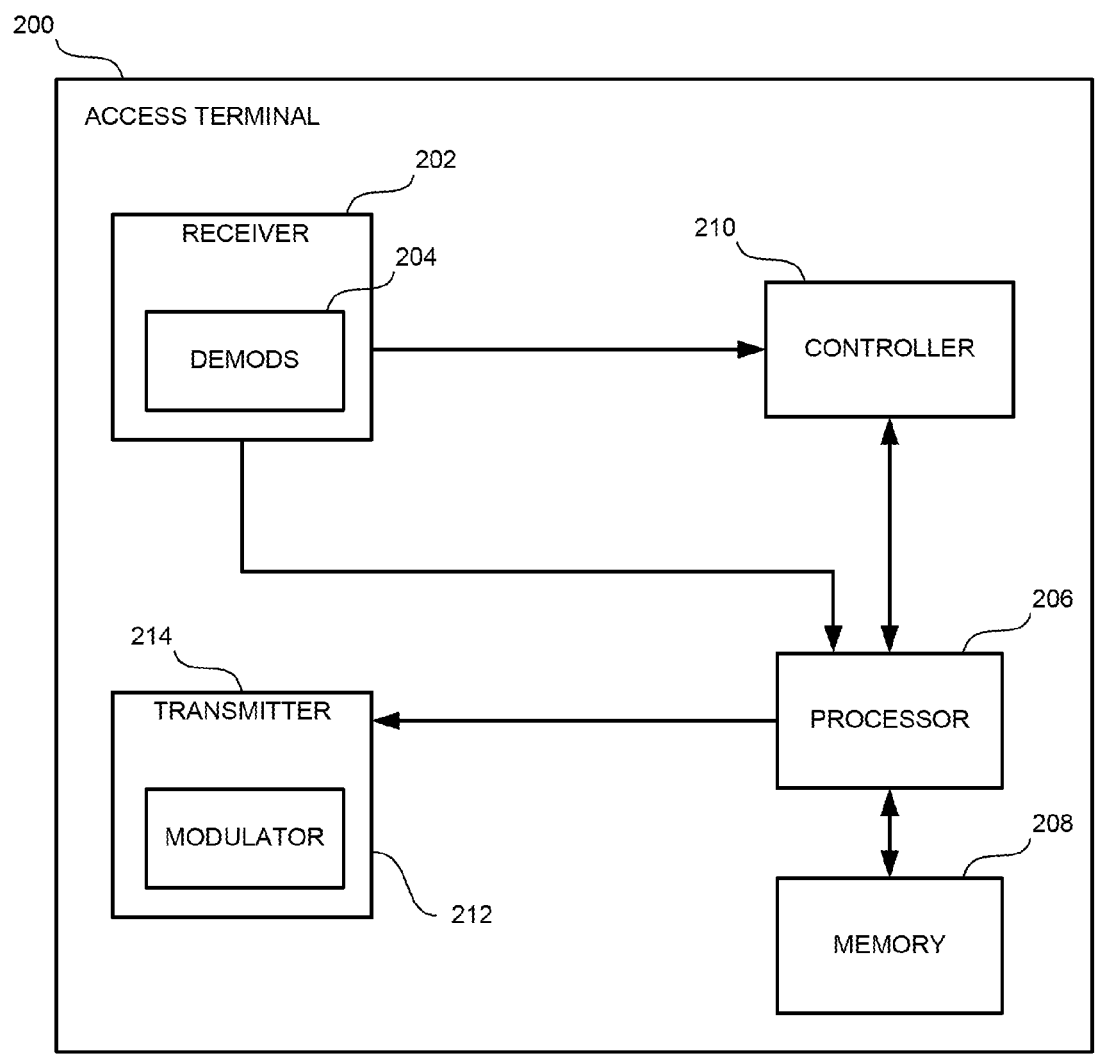
FIG. 2 illustrates an example of an access terminal that is capable of cooperative multifunctional communication in a wireless communications system.

FIG. 2 is an illustration of an access terminal that is capable of cooperative multifunctional communication in a wireless communications system. The access terminal 200 may correspond to the access terminal 102 shown in FIG. 1. As shown in FIG. 2, the access terminal 200 may include a receiver 202 that receives multiple signals from, for instance, one or more receive antennas (not shown), performs typical actions on (e.g., filters, amplifies, downconverts, etc.) the received signals, and digitizes the conditioned signals to obtain samples. The receiver 202 may be configured to be able to communicate within various networks, such as GNSS, WAN, LAN, and PAN. The receiver 202 may be a single receiver, as shown, or include multiple receivers for each separate communication protocol. The receiver 202 may also include a plurality of demodulators 204 that can demodulate received symbols from each signal and provide them to a processor 206. The processor 206 can be a processor dedicated to analyzing information received by the receiver 202 and/or generating information for transmission by a transmitter 216, a processor that controls one or more components of the access terminal 200, and/or a processor that both analyzes information received by the receiver 202, generates information for transmission by the transmitter 216, and controls one or more components of the access terminal 200.

The access terminal 200 may additionally include memory 208 that is operatively coupled to the processor 206 and that can store data to be transmitted, received data, information related to available channels, data associated with analyzed signal and/or interference strength, information related to an assigned channel, power, rate, or the like, and any other suitable information for estimating a channel and communicating via the channel. Memory 208 can additionally store protocols and/or algorithms associated with estimating and/or utilizing a channel (e.g., performance based, capacity based, etc.).

It will be appreciated that the data store (e.g., memory 208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 208 of the subject systems and methods is intended to comprise, without being limited to, these and any other suitable types of memory.

The receiver 202 can further be operatively coupled to a controller 210 that can initialize discovery of proxy devices, exchange capability information with discovered proxy devices, and delegate tasks according to proxy device capabilities, and/or power sensitivity of the access terminal 200. The controller 210 can further control the acquisition and storage in memory 208 of the proxy device capabilities, power sensitivity, and direct communications with servers, base stations, satellites and devices on other networks, by interfacing with transmitter 214 via the processor 206, as discussed with reference to FIG. 1. The transmitter 214 may be configured to communicate within various networks, such as GNSS, WAN, LAN, and PAN. The transmitter 214 may be a single transmitter, as shown, or include multiple transmitters for each separate communication protocol.

Furthermore, the transmitter 214 and the receiver 202, although shown as separate components, may be integrated into a single component, such as a transceiver. The transceiver may retain all of the functions of the receiver 202 and transmitter 214, and as such, may be configured to transmit and receive signals within various networks, such as GNSS, WAN, LAN, and PAN. The transceiver may also be either a single integrated transceiver capable of multi-protocol communication, or include multiple separate transceivers for each respective communication protocol. For example, the transceiver may include high power transceivers (e.g., GNSS, WAN, and LAN transceivers) and a low power transceiver (e.g., PAN transceiver).

The access terminal 200 still further comprises a modulator 212 that modulates and transmits signals via transmitter 214 to, for instance, a LAN server, a satellite, a base station, a web/internet access point name (APN), and another access terminal, etc. Although depicted as being separate from the processor 206, it is to be appreciated that the controller 210, demodulators 204, and/or modulator 212 can be part of the processor 206 or multiple processors (not shown). Furthermore, the functions of the controller 210 may be integrated in an application layer, a data stack, an HTTP stack, at the operating system (OS) level, in an internet browser application, or in an application specific integrated circuit (ASIC).

Figure 3:
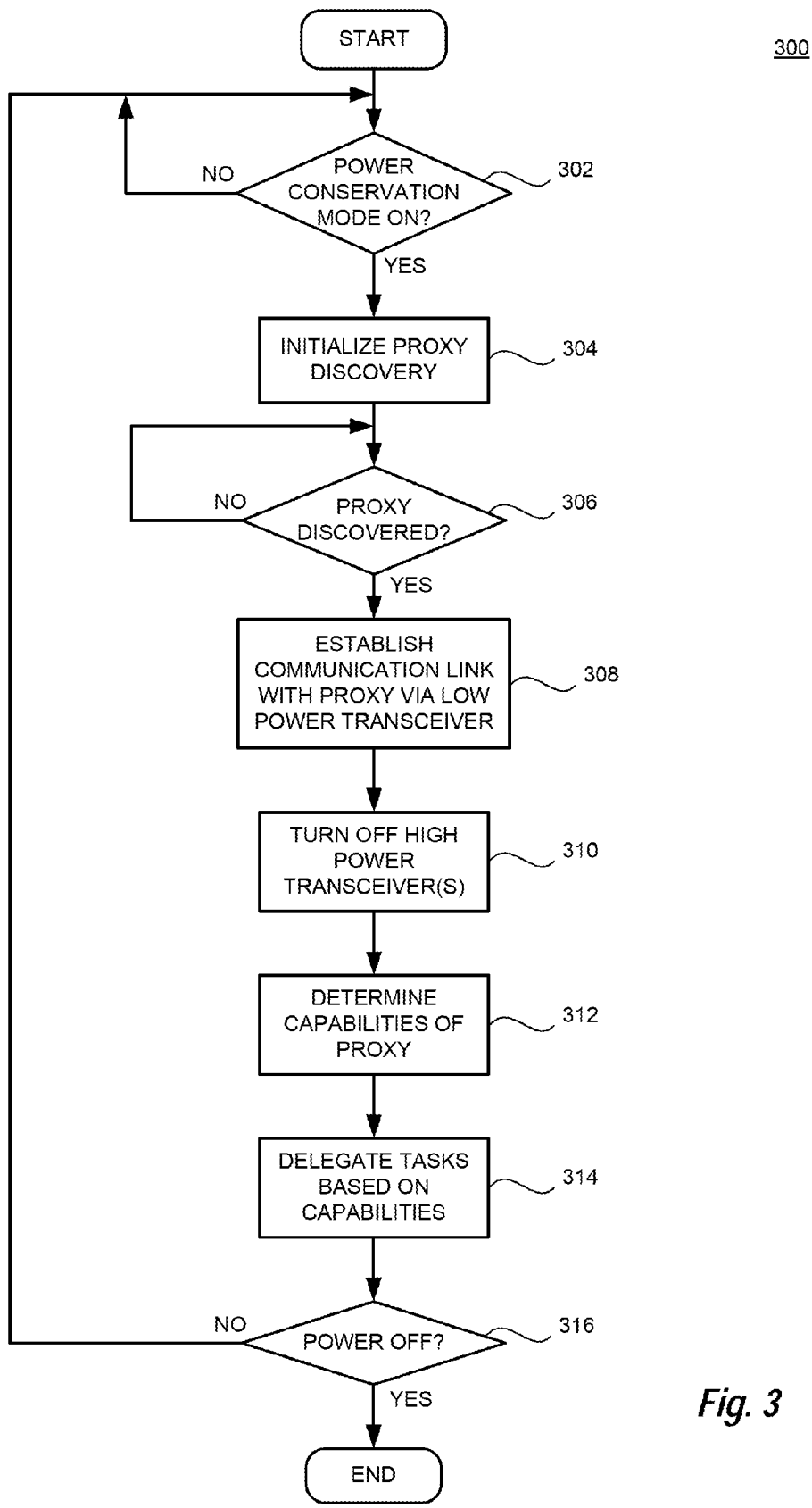
FIG. 3 is a flow chart illustrating an example of a process for controlling cooperation in a communications system.

FIG. 3 is a flow chart illustrating an example of a process capable of cooperative multifunctional communication in a wireless communications system. The process may be an algorithm implemented in the controller 210 and/or processor 206 of the access terminal 200. As shown in FIG. 3, in block 302, a determination may be made as to whether power conservation mode is on. If the power conservation mode is on, the process may proceed to block 304. Otherwise, the process returns to block 302. For example, the access terminal 102 may enter power conservation mode when its power source is limited.

In block 304, proxy discovery may be initialized, and the process may proceed to block 306. For example, the access terminal 102, upon entering power conservation mode, may begin searching for a proxy host terminal to which it may delegate certain tasks so as to conserve battery power.

In block 306, a determination may be made as to whether a proxy is discovered. If a proxy is discovered, the process may proceed to block 308. Otherwise, the process may return to block 306. For example, the access terminal 102 may search for and discover host terminal 104.

In block 308, a communication link with the proxy via a low power transceiver may be established, and the process may proceed to block 310. For example, the access terminal 102, upon discovering the host terminal 104, may establish a communication link between itself and the host terminal 104 via respective low power transceivers.

In block 310, high power transceiver(s) may be turned off, and the process may proceed to block 312. For example, the access terminal 102, upon establishing a communication link with the host terminal 104, may proceed to power down its all of its high power transceivers, such as the GNSS, WAN, and LAN transceivers.

In block 312, capabilities of the discovered proxy may be determined, and the process may proceed to block 314. For example, the access terminal 102 may request and receive from the host terminal 104 a list of its capabilities so as to determine the types of tasks the access terminal 102 may delegate to the host terminal 104.

In block 314, tasks may be delegated based on capabilities, and the process may proceed to block 316. For example, the access terminal 102, upon determining the tasks host terminal 104 may perform, may delegate one or more specific tasks to the host terminal 104. Such tasks may be GNSS navigation, network search and acquisition, base station signal monitoring, pattern identification and/or classification, sensing, etc.

In block 316 a determination may be made as to whether the access terminal 102 is powered off. If the access terminal 102 is not powered off, the process may return to block 302. Otherwise, the process may end.

Figure 4:
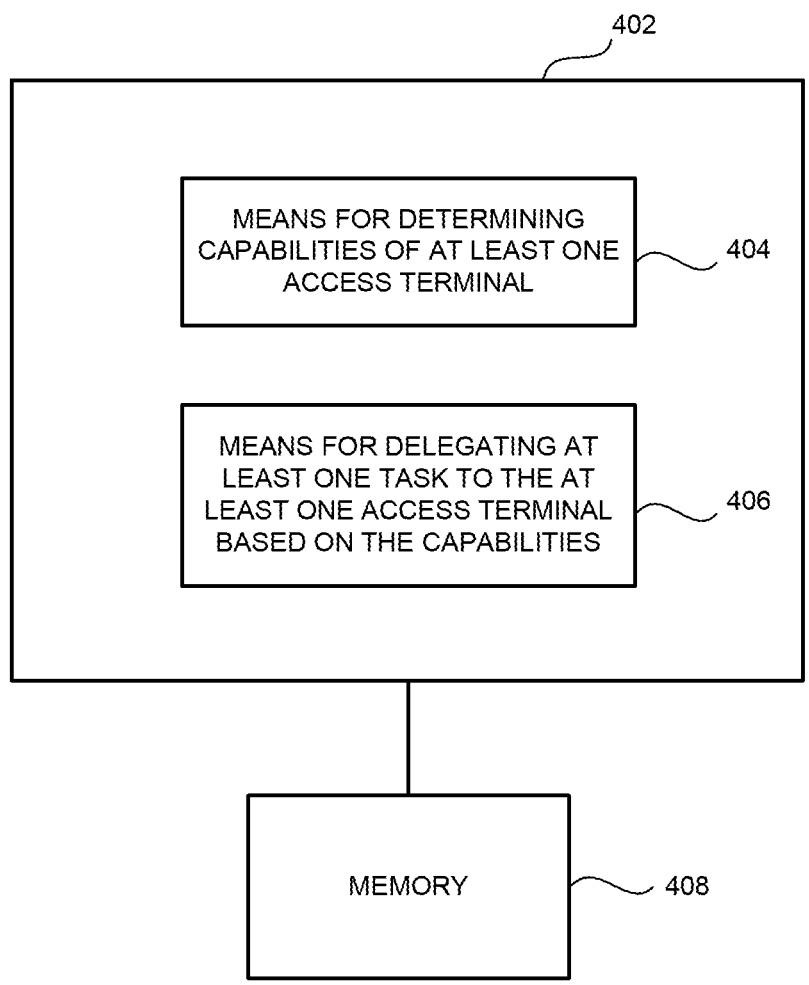
FIG. 4 is an illustration of an example system that controls cooperation in a communications system.

FIG. 4 is an illustration of an example system 400 that is capable of cooperative multifunctional control in a wireless communication system. For example, system 400 can reside at least partially within an access terminal, etc. It is to be appreciated that system 400 is represented as including functional blocks, which can be functional blocks that represent functions implemented by a processor, software, or combination thereof (e.g., firmware). System 400 includes a logical grouping 402 of means that can act in conjunction. For instance, logical grouping 402 can include: means for determining capabilities of at least one access terminal 404; and means for delegating at least one task to the at least one access terminal based on the capabilities 406. Additionally, system 400 can include a memory 408 that retains instructions for executing functions associated with the means 404 and 406. While shown as being external to memory 408, it is to be understood that one or more of the means 404 through 406 can exist within memory 408.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A wireless communication apparatus, comprising:
   a controller included in the wireless communication apparatus and configured to:
      inquire for a list of capabilities from at least one remote access terminal when a remaining power of the wireless communication apparatus is less than a threshold;
      receive the list of capabilities from the at least one remote access terminal, the list comprising a plurality of functions that the at least one remote access terminal is configured to perform;
      determine capabilities of the at least one remote access terminal from the list;
      determine a strength of a link between the wireless communication apparatus and each of the at least one remote access terminal;
      delegate at least one task to a remote access terminal of the at least one remote access terminal based on the capabilities determined from the list and the determined strength of the link between the wireless communication apparatus and each of the at least one remote access terminal;
      receive, through a low power transceiver of the wireless communication apparatus, a paging message from the at least one remote access terminal when a high power transceiver of the wireless communication apparatus is powered down, the paging message comprising a portion of an original paging content intended for the wireless communication apparatus; and
      transmit a paging response to the paging message through the high power transceiver of the wireless communication apparatus to a base station, without transmission of the paging response to at least one remote access terminal,
   wherein the wireless communication apparatus comprises an access terminal.

2. The wireless communication apparatus of claim 1, wherein the controller is further configured to discover the at least one remote access terminal.

3. The wireless communication apparatus of claim 1, wherein the controller is further configured to delegate the at least one task based on power sensitivity of the remote access terminal.

4. The wireless communication apparatus of claim 1, wherein the controller is further configured to establish a communication link with the remote access terminal via the low power transceiver.

5. The wireless communication apparatus of claim 4, wherein the controller is further configured to power down all transceivers except the low power transceiver.

6. The wireless communication apparatus of claim 5, wherein the low power transceiver is configured to transmit and receive signals within a personal area network (PAN).

7. The wireless communication apparatus of claim 1, wherein the controller is further configured to delegate different tasks to a plurality of remote access terminals, respectively.

8. The wireless communication apparatus of claim 1, wherein the controller is further configured to delegate a task to the remote access terminal requiring the remote access terminal to receive navigation signals from a Global Navigation Satellite Systems (GNSS) network.

9. The wireless communication apparatus of claim 8, wherein the task requiring the remote access terminal to receive navigation signals from the GNSS further requires the remote access terminal to determine geographical coordinates on behalf of the controller.

10. The wireless communication apparatus of claim 1, wherein the controller is further configured to delegate a task to the remote access terminal requiring the remote access terminal to communicate within a Wide Area Network (WAN).

11. The wireless communication apparatus of claim 10, wherein the task requiring the remote access terminal to communicate within the WAN further requires the remote access terminal to monitor signals from a base station on behalf of the controller.

12. The wireless communication apparatus of claim 1, wherein the controller is further configured to delegate a task to the remote access terminal requiring the remote access terminal to communicate within a Local Area Network (LAN).

13. The wireless communication apparatus of claim 12, wherein the task requiring the remote access terminal to communicate within the LAN further requires the remote access terminal to search for available networks on behalf of the controller.

14. The wireless communication apparatus of claim 1, wherein a task delegated to the remote access terminal is data processing.

15. The wireless communication apparatus of claim 1, wherein a task delegated to the remote access terminal is optical, acoustical, or chemical sensing.

16. A method for wireless communication, comprising:
inquiring, by a terminal, a list of capabilities from at least one remote access terminal when a remaining power of the terminal is less than a threshold;
receiving, at the terminal, the list of capabilities from the at least one remote access terminal, the list comprising a plurality of functions that the at least one remote access terminal is configured to perform;
determining, by the terminal, capabilities of the at least one remote access terminal from the list;
determining, by the terminal, a strength of a link between the terminal and each of the at least one remote access terminal;
delegating, by the terminal, at least one task to a remote access terminal of the at least one remote access terminal based on the capabilities determined from the list and the determined strength of the link between the terminal and each of the at least one remote access terminal;
receiving, by the terminal and through a low power transceiver of the terminal, a paging message from the at least one remote access terminal when a high power transceiver of the terminal is powered down, the paging message comprising a portion of an original paging content intended for the terminal; and
transmitting, by the terminal, a paging response to the paging message through the high power transceiver of the terminal to a base station, without transmitting the paging response to the at least one remote access terminal.

17. The method of claim 16, further comprising discovering the at least one remote access terminal.

18. The method of claim 16, wherein delegating the at least one task further comprises delegating the at least one task based on power sensitivity of the remote access terminal.

19. The method of claim 16, further comprising establishing a communication link with the remote access terminal via the low power transceiver.

20. The method of claim 19, further comprising powering down all transceivers except the low power transceiver.

21. The method of claim 20, wherein the low power transceiver is configured to transmit and receive signals within a personal area network (PAN).

22. The method of claim 16, further comprising delegating different tasks to a plurality of remote access terminals, respectively.

23. The method of claim 16, wherein delegating the at least one task further comprises delegating a task to the remote access terminal requiring the remote access terminal to receive navigation signals from a Global Navigation Satellite Systems (GNSS) network.

24. The method of claim 23, wherein the task requiring the remote access terminal to receive navigation signals from the GNSS further requires the remote access terminal to determine geographical coordinates.

25. The method of claim 16, wherein delegating the at least one task further comprises delegating a task to the remote access terminal requiring the remote access terminal to communicate within a Wide Area Network (WAN).

26. The method of claim 25, wherein the task requiring the remote access terminal to communicate within the WAN further requires the remote access terminal to monitor signals from a base station.

27. The method of claim 16, wherein delegating the at least one task further comprises delegating a task to the remote access terminal requiring the remote access terminal to communicate within a Local Area Network (LAN).

28. The method of claim 27, wherein the task requiring the remote access terminal to communicate within the LAN further requires the remote access terminal to search for available networks.

29. The method of claim 16, wherein a task delegated to the remote access terminal is data processing.

30. The method of claim 16, wherein a task delegated to the remote access terminal is optical, acoustical, or chemical sensing.

31. An apparatus comprising:
means for inquiring, by the apparatus, for a list of capabilities from at least one remote access terminal when a remaining power of the apparatus is less than a threshold;
means for receiving, by the apparatus, the list of capabilities from the at least one remote access terminal, the list comprising a plurality of functions that the at least one remote access terminal is configured to perform;
means for determining, by the apparatus, capabilities of the at least one remote access terminal from the list
means for determining, by the apparatus, a strength of a link between the apparatus and each of the at least one remote access terminal;
means for delegating, by the apparatus, a task to the at least one remote access terminal of the at least one remote access terminal based on the capabilities determined from the list and the determined strength of the link between the apparatus and each of the at least one remote access terminal;
means for receiving, by the apparatus and through a low power transceiver of the apparatus, a paging message from the at least one remote access terminal when a high power transceiver of the apparatus is powered down, the paging message comprising a portion of an original paging content intended for the apparatus; and
means for transmitting, by the apparatus and through the high power transceiver, a paging response in a wide area network message to a base station, without transmitting the paging response to the at least one remote access terminal,
wherein the apparatus comprises an access terminal.

32. A non-transitory computer-readable medium storing computer executable code for an access terminal, comprising code for:
inquiring, by the access terminal, for a list of capabilities from at least one remote access terminal when a remaining power of a terminal is less than a threshold;

receiving, at the access terminal, the list of capabilities from the at least one remote access terminal, the list comprising a plurality of functions that the at least one remote access terminal is configured to perform;

determining, by the access terminal, capabilities of the at least one remote access terminal from the list;

determining, by the access terminal, a strength of a link between the terminal and each of the at least one remote access terminal;

delegating, by the access terminal, at least one task to a remote access terminal of the at least one remote access terminal based on the capabilities determined from the list and the determined strength of the link between the terminal and each of the at least one remote access terminal;

receiving, by the access terminal and through a low power transceiver of the access terminal, a paging message from the at least one remote access terminal when a high power transceiver of the access terminal is powered down, the paging message comprising a portion of an original paging content intended for the access terminal; and transmitting, by the access terminal, a paging response to the paging message through the high power transceiver of the access terminal to a base station, without transmitting the paging response to the at least one remote access terminal.

33. The wireless communication apparatus of claim 1, wherein the controller is further configured to receive results of a performance of the at least one task from the remote access terminal.

34. The wireless communication apparatus of claim 1, wherein the portion of the original paging content includes a traffic channel and a sector, and wherein the paging response is transmitted directly to the base station.

35. The method of claim 16, wherein the portion of the original paging content includes a traffic channel and a sector, and wherein the paging response is transmitted directly to the base station.

36. The apparatus of claim 31, wherein the portion of the original paging content includes a traffic channel and a sector, and wherein the paging response is transmitted directly to the base station.

37. The non-transitory computer-readable medium of claim 32, wherein the portion of the original paging content includes a traffic channel and a sector, and wherein the paging response is transmitted directly to the base station.

* * * * *